United States Patent [19]

Berlekamp et al.

[11] Patent Number: 4,803,566
[45] Date of Patent: Feb. 7, 1989

[54] DIGITAL TIME BASE CORRECTION USING A REFERENCE BIT

[75] Inventors: Elwyn R. Berlekamp, Berkeley; James A. Bixby, San Diego; James U. Lemke, Del Mar, all of Calif.

[73] Assignee: Eastman Kodak Company, Rochester, N.Y.

[21] Appl. No.: 518,995

[22] Filed: Aug. 1, 1983

[51] Int. Cl.⁴ .................. G11B 5/00; G11B 5/09; G11B 27/19; G11B 27/28
[52] U.S. Cl. ..................... 360/26; 360/36.1; 360/51; 371/61
[58] Field of Search ............. 360/26, 36.1, 51; 371/61

[56] References Cited

U.S. PATENT DOCUMENTS

| Re. 25,405 | 6/1963 | Witt et al. | 340/174.1 |
|---|---|---|---|
| Re. 25,527 | 3/1964 | Floros | 360/26 |
| 3,130,392 | 4/1964 | Miller | 360/26 |
| 3,154,762 | 10/1964 | Morphet | 360/51 X |
| 3,281,805 | 10/1966 | Perry | 360/51 |
| 3,412,385 | 11/1968 | Wang et al. | 360/51 X |
| 3,509,531 | 4/1970 | Wilkinson et al. | 340/146.1 |
| 3,562,723 | 2/1971 | Behr | 360/26 |
| 3,602,892 | 8/1971 | Norris et al. | 340/172.5 |
| 3,792,436 | 2/1974 | De Voy et al. | 360/26 X |
| 3,851,335 | 11/1974 | Elliott | 360/26 |
| 4,115,759 | 9/1978 | Besenfelder | 340/146.1 F |
| 4,270,183 | 5/1981 | Robinson | 360/51 X |
| 4,330,846 | 5/1982 | Colles et al. | 364/900 |
| 4,342,057 | 7/1982 | La Beau et al. | 360/26 X |

FOREIGN PATENT DOCUMENTS 0633859 2/1963 Belgium .................. 360/26

OTHER PUBLICATIONS

IBM-TDB, Skov et al., Buffer System, vol. 2, No. 5 Feb./60.

*Primary Examiner*—Stuart N. Hecker
*Assistant Examiner*—Alyssa H. Bowler
*Attorney, Agent, or Firm*—Robert F. Cody

[57] ABSTRACT

In a multi-channel device for the processing of digital data bytes comprised of parallel arrangements of data bits, the invention calls for recognition of the fact that—irrespective of skew and other interchannel variations in the processing of such data bits—the median-occurring bit of each successive data byte constitutes a good representative of the time of occurrence of the byte in question. By suitably buffering the bits of successive data bytes, a "median clock" that is slaved to the aforenoted "median-occurring" bits may be used to clock data bytes—devoid of inter-channel timing errors—out of the apparatus used for the indicated buffering operation.

13 Claims, 6 Drawing Sheets

] = BITS OF THE SAME BYTE

DIGITAL TIME BASE CORRECTION USING A REFERENCE BIT

BACKGROUND OF THE INVENTION

1. Field of the Invention

This invention relates in general to time base correction apparatus and, in particular, to such apparatus as may be employed in the processing of multi-channel digital signals.

The invention as well as the prior art will be described with reference to the figures of which

2. Description Relative to the Prior Art

Time base distortion occurs whenever a signal, or portion thereof, occurs too early or too late relative to a reference time frame. In a multi-channel longitudinal recorder, a multi-channel recording head is used to record information signals along a plurality of tracks on a recording medium such as a magnetic tape. The recorded signals are played back by means of a multi-channel playback head. If the recording and playback heads are perfectly aligned, and if the transport system that advances the recording medium does so at a perfectly uniform velocity, the played back signals will represent a faithful reproduction of the originally recorded information signals. Practical systems, however, are not so perfect.

A conventional multi-channel magnetic (recording or playback) head has a stack of aligned transducer gaps. The alignment of such gaps constitutes a "gap line". The recording and playback heads are perfectly aligned when their respective gap lines have the same azimuthal angle (e.g. 90 degrees) with respect to the direction of tape advancement (in the same plane). For various reasons, however, the recording and playback heads in practical systems are often not perfectly aligned. Such misalignment has the effect of producing time base distortion in the form of relative phase errors among the played back information signals.

Time base distortion can also be caused in a magnetic recorder by the tape transport system. Specifically, as the tape advances (during recording or playback) it may yaw about an axis perpendicular to the plane of its recording surface, thereby introducing time base distortion in the form of relative phase errors similar to those produced by head misalignment. In this case, however, the "misalignment" varies with the tape yaw as a function of time.

Figure 1:
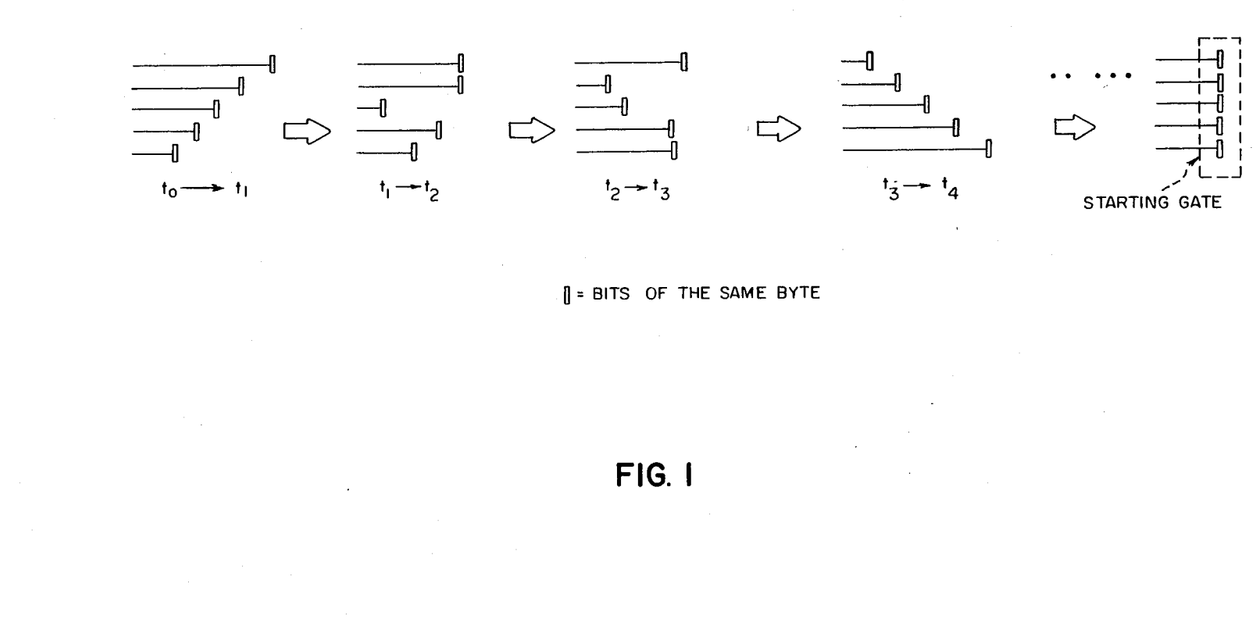
FIG. 1-3 are diagrams useful in describing the invention.

In connection with the multi-channel processing of digital information—whether within a recorder or not—it is essential that the bits (which are processed in respective channels) of each given byte be of the same time frame. The present invention, as will be evident below, concerns time base correction of digital signals; and, to facilitate understanding of the problem solved by means of the invention, the invention is perhaps best perceived as involving magnetic tape recorder apparatus. As digital bit rates reach astronomical levels, e.g. gigabits per second ... and as the packing density of digital information which may be recorded, e.g. 30 million bits per square inch or more, on magnetic media reaches a level which boggles the mind ... the need for some means to keep the associated bits of each given byte in the same time frame heightens. All sorts of time base instabilities are possible: the bits of a byte may statically or dynamically skew one way—or a different way—relative to each other; and/or such bits may haphazardly gain or lose time-position relative to each other. Consider, for example, the representative showings of FIG. 1: Between times $t_0$ and $t_1$, the bits of a certain byte are skewed one way, as might have been caused by a clockwise yawing of magnetic tape supplying the byte. Between times $t_1$ and $t_2$, the skew appears to be gone, but the bits are clearly not in the same time frame ... this perhaps occurring as a result of transient electrical interchannel disturbances. Between times $t_2$ and $t_3$, the bits again shift time-position, only this time, perhaps, the shift is associated with mechanical microvibration among the cores of the playback head. Between times $t_3$ and $t_4$, the bits again appear skewed, only this time, perhaps, as a result of a counterclockwise yaw of the magnetic tape. Looking at FIG. 1, it would appear that the bits of the byte in question behave like horses in a race ... constantly shifting position, back and forth, relative to one another. With this analogy in mind then, it will be for the invention to provide—in a sense—a continuously self-adjusting "starting gate" so that the horses (bits) start their travel (playback processing) together. Again see FIG. 1.

For prior art against which the invention may be compared, reference should be had to U.S. Pat. No. 4,330,846, and to the references which were cited therein. See, also, U.S. Pat. No. 4,342,057.

SUMMARY OF THE INVENTION

In a multi-channel device for the processing of digital data bytes comprised of parallel arrangements of data bits, the invention calls for recognition of the fact that—irrespective of skew and other interchannel variations in the processing of such data bits—the median-occurring bit of each successive data byte constitutes a good representation of the time of occurrence of the byte in question. By suitably buffering the bits of successive data bytes, a "median clock" that is slaved to the aforenoted "median-occurring" bits may be used to clock data bytes—devoid of inter-channel timing errors—out of the apparatus used for the indicated buffering operation. In the event the flow of data bytes is subject to flutter which affects the processing of data bytes in all of the indicated processing channels, the median clock correspondingly varies to preserve the absence of inter-channel timing errors among the bits exiting the buffering apparatus.

DETAILED DESCRIPTION OF THE INVENTION

Figure 2:
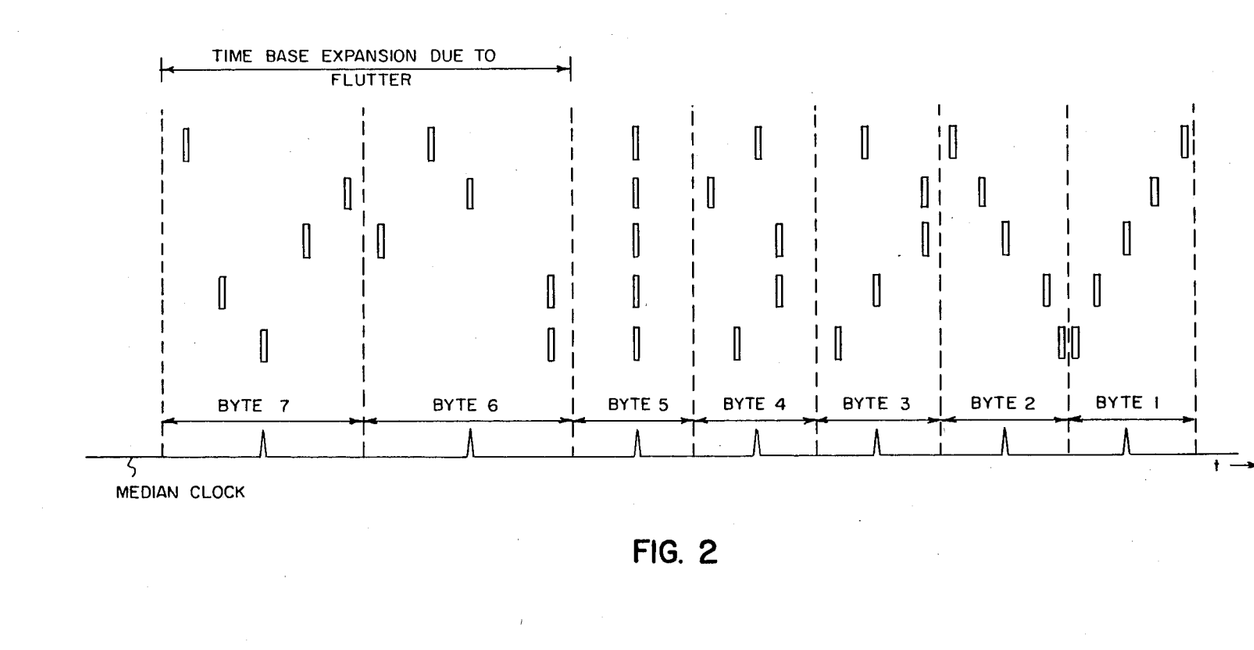

With the above summary of the invention in mind, reference should now be had to FIG. 2 which shows a succession of bytes involving various bit-to-bit timing situations. In byte 1, the bits are skewed one way; in byte 2, they are skewed the other way. Bytes 3 and 4 find the bits randomly shifted about; and byte 5 finds all of the bits in the same time frame. In response to flutter within the bit stream, the bits of bytes 6 & 7 spread out, albeit that they again have a random distribution of time-positions. Pursuant to the invention as outlined in the above Summary of the Invention, it will be for the invention to determine the median occurring bit within each byte, and to create a clock based on such determination—such clock being thereafter used in further byte-processing. Note in FIG. 2 the "median clock" and the fact that such clock follows the indicated flutter.

Before addressing actual hardware for practicing the invention, it is believed appropriate first to describe somewhat of an overview of how apparatus according to the invention works to bring about time coherence among the bits of successive bytes: Consider, therefore, the showing of FIG. 3 which indicates the bits of a succession of bytes flowing into respective buffer memories. The buffer memories are depicted as comprised of two equisized parts apiece. As a result of time base instabilities, the memory parts I, to a varying extent, dynamically fill with bits, some overflowing into memory parts II, and other not filling at all. One buffer memory, however, has a full part I, and an empty part II. This happenstance occurs in response to a "median-bit condition" . . . and, as will be appreciated below, the clock produced in response thereto is employed to clock data bytes (comprised of coherent sets of data bits) out of the buffer memory parts I. So long as the time coherence among the bits of a given byte is such that a buffer memory part 11 does not "overflow", the memory parts I will continually and dynamically take up the slack among the bit channels. It may turn out that, as time goes by, the indicated buffer memory that has a full part I and an empty part II gradually starts to fill its part II (or empty its part I). As this occurs, a different buffer memory will gradually approach the so-called "median-bit condition", and thereby serve to initiate clocking signals for clocking bits out of the buffer memory parts I. The point is that, at any one time, one buffer memory (comprised of parts I and II) can have a full part I and an empty part II, albeit that the particular buffer memory having this condition may change depending on the interchannel timing among of the bits of the bytes which are processed.

Figure 4:
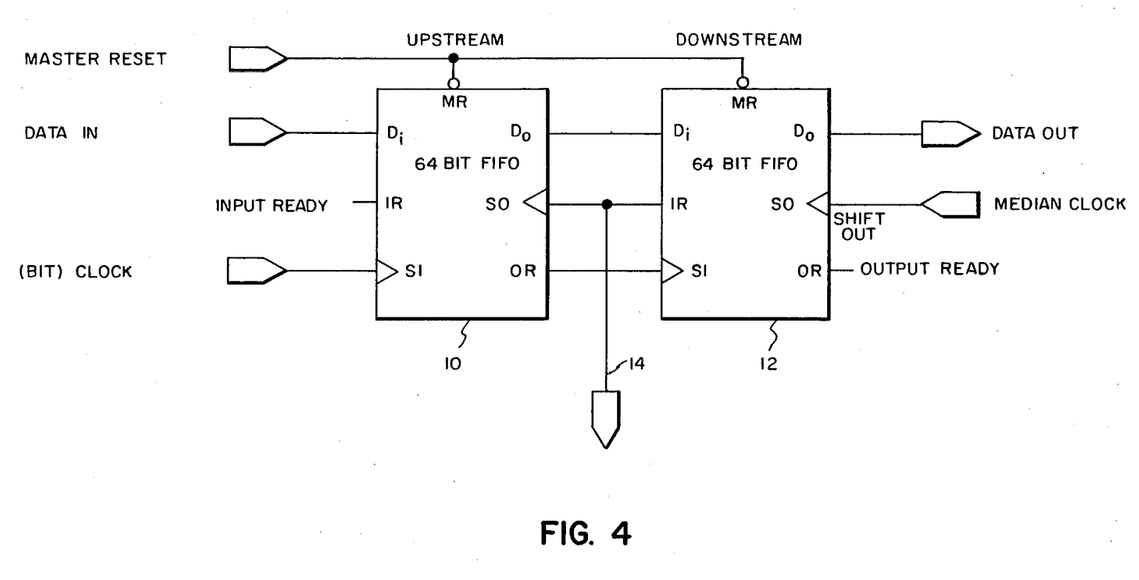
FIG. 4 is a block diagram of a presently preferred buffer useful in the practice of the invention.

Given the above overview of how apparatus according to the invention works to provide time coherence among bits, reference should now be had to FIG. 4 which depicts a presently preferred form of buffer memory for implementing the invention. It should be understood that there will be as many FIG. 4 structures as there are bits per bytes, i.e. there is one structure as in FIG. 4 for each bit channel:

Each buffer memory is comprised of a pair of asynchronous two-port memories 10, 12 commonly called FIFOs (first-in, first-out serial memories). Typical of such devices are components 74LS222, available from Texas Instruments, Inc. The two FIFOs—which in this case are 64-bit FIFOs—are connected together as indicated; and cooperate as follows: Incoming bits are clocked into the upstream FIFO 10 by a (bit) clock applied to a SI (Shift-In) line. Initially, the two FIFOs are empty, and any input bit flows through the FIFO 10 to its output $D_o$. When a bit appears at the FIFO 10 output $D_o$, the OR (Output Ready) line of the FIFO 10 goes high, clocking the bit in question into ($D_i$) the downstream FIFO 12. As the downstream FIFO 12 accepts the bit, its IR (Input Ready) line goes low to indicate that it cannot immediately accept another bit. As soon as the input bit "percolates" into the downstream FIFO 12, the IR line of the FIFO 12 again goes high . . . a flagging signal . . . indicating willingness to accept another data bit. This positive-going IR line of the FIFO 12 clocks the received bit clear of the upstream FIFO 10.

When 64 more data bits are clocked in than are clocked out of the downstream FIFO 12, it becomes full. As it accepts the 64th such bit, its IR line goes low . . . and stays that way so long as the downstream FIFO 12 is full. This "handshaking" between upstream and downstream FIFOs 10, 12 causes data to "stack up", waiting to be clocked out of the upstream FIFO 10, and into the downstream FIFO 12, as soon as space becomes available in the downstream FIFO 12.

Monitoring (14) the SO/IR line between the upstream and downstream FIFOs 10, 12 serves to indicate whether the downstream FIFO 12 is full, i.e. the IR line of the FIFO 12 will be low provided the downstream FIFO 12 is full . . . and high if such FIFO is not full.

Figure 3:
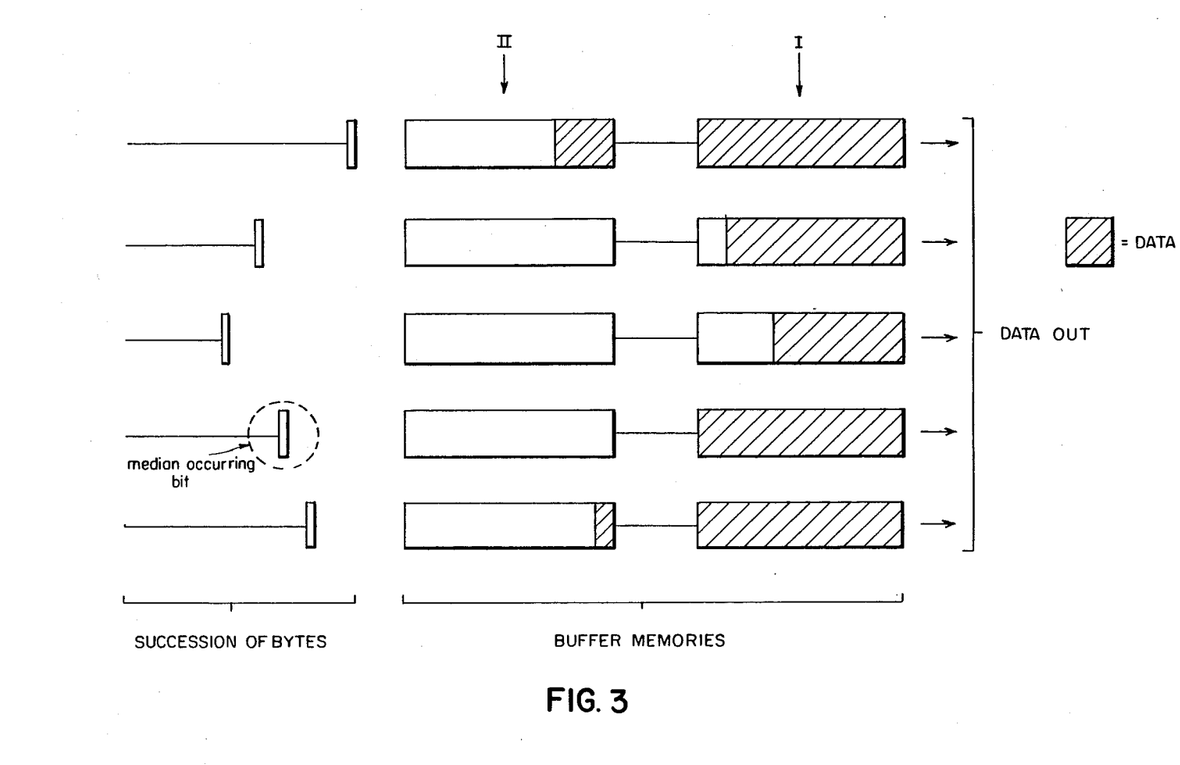
Figure 5:
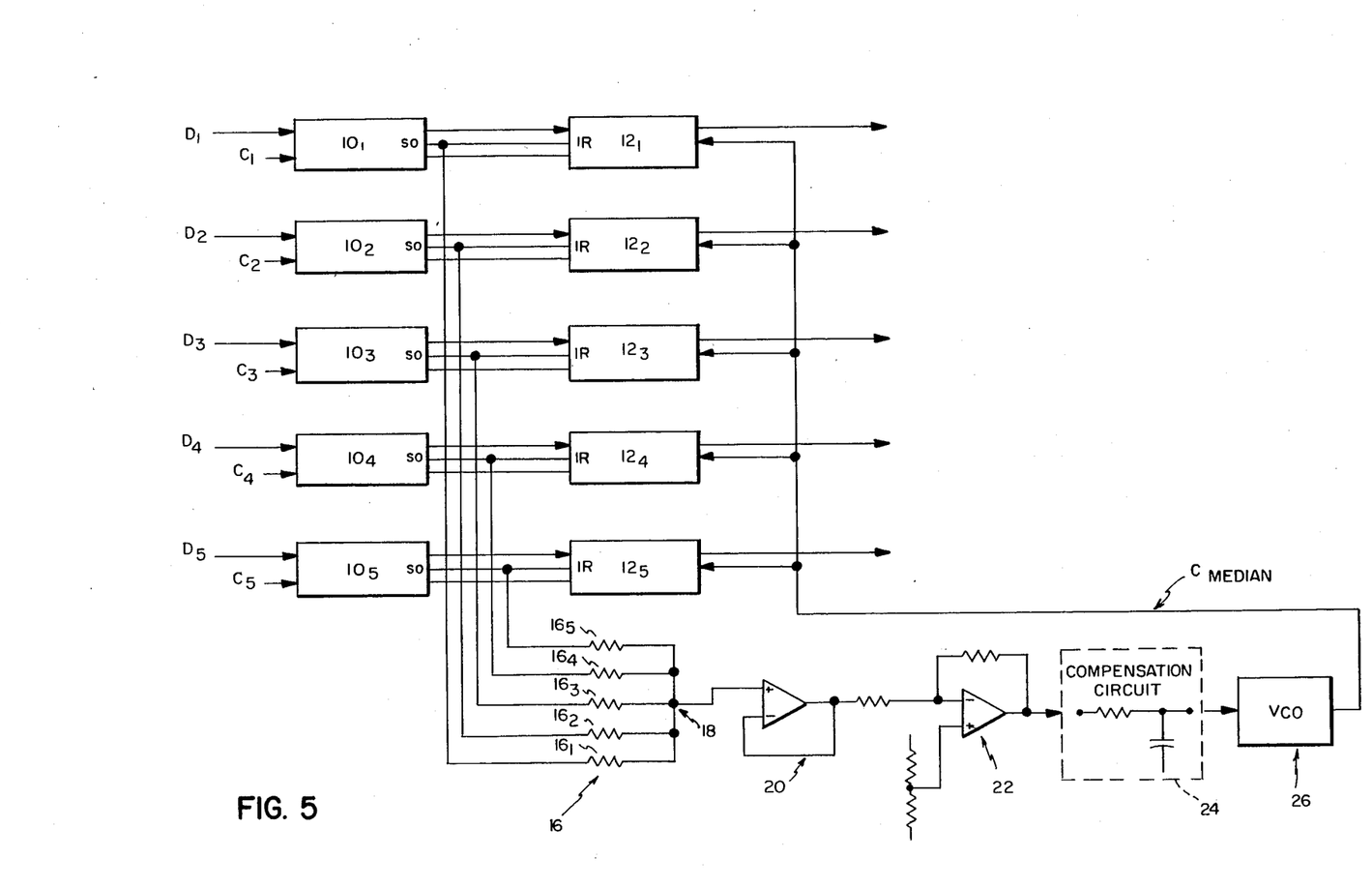
FIG. 5 is a schematic circuit diagram illustrating apparatus according to the invention.

With the overview of FIG. 3, and the workings of the apparatus of FIG. 4, in mind, reference should now be had to FIG. 5; as indicated, the system depicted is (by way of example) a five-channel system, i.e. 5 bits per byte.

For each of the five channels in question, a pair of FIFOs have been hooked together as buffers . . . like character numbers being used in FIGS. 4 & 5, with subscripts identifying the appropriate bit channels. The Shift Out/Input Ready (SO/IR) "handshaking" lines are connected into a digital-to-analog resistive summing network 16; and the analog voltage—which appears at the common connection of five resistors $16_1$ through $16_5$—corresponds to the number of full downstream FIFOs $12_1$ through $12_5$. In the setup of FIG. 5, a summation voltage of about zero volts corresponds to five full downstream FIFOs; and approximately four volts corresponds to five empty downstream FIFOs. If we were to start with all downstream FIFOs $12_1$ through $12_5$ empty . . . and if we were then to fill them one by one . . . the common resistor terminal 18 of the summation network 16 would develop an analog voltage that gradually decreased to zero in five discrete steps, each such step representing the "positions" of the five data bit streams. Four volts would represent "data offscale to the downstream side"; and zero volts would represent "data offscale to the upstream side". In the presently preferred form of the invention, operation is at the midpoint of the indicated voltage range, viz. at a "data position" voltage of two volts. Such a voltage represents "average data centered in FIFOs". If the peak skew of the five data bits is less than ±64 bits, the most recent data bit of all five data streams must reside within the FIFOs. By clocking data out of the FIFOs at the average of the input clock rates, i.e. by means of a clock $C_{median}$ corresponding to the median bit of each successive byte, the data position voltage appearing at the common resistor terminal 18 remains constant. If the output clock average rate were to be too high, the "data position" in the FIFOs would drift toward the downstream FIFOs, and the data position voltage at 18 would increase. Conversely, were the output clock rate to be too low, the "data position" would drift toward the upstream FIFOs, and the data position voltage at 18 would decrease.

The analog voltage (at 18) representing data position is buffered by an operational amplifier 20, after which a second amplifier 22 serves to scale and condition such voltage. The matter of scaling will be discussed below. After smoothing by a compensation circuit 24, the output of the amplifier 22 is applied to a voltage-controlled oscillator (VCO) 26, the output frequency of which increases a the data position voltage decreases, and vice versa. The VCO output—which corresponds to the median-occurring bits of successive bytes—is then used to clock data out of the FIFOs $12_1$ through $12_5$. Such an arrangement constitutes a closed loop, where the fullness of the downstream FIFOs $12_1$ through $12_5$ controls the effective output clock rate provided by the VCO 26.

The resistive network 16 and operational amplifier components are chosen so that the VCO 26 is stable with two downstream FIFOs 12 full, two empty, and one full half the time. In other words, by means of the invention, the input data gets so positioned within the downstream FIFOs that. the VCO output shift clock corresponds with the median of the instantaneous input bit clock rates: for data which occurs too fast (i.e. skewed-ahead data), the FIFOs allow a gain up to 64 bits; for data which occurs too slow (i.e. skewed-behind data), the FIFOs allow the data to fall back by as much as 64 bits without any data being lost.

Figure 6:
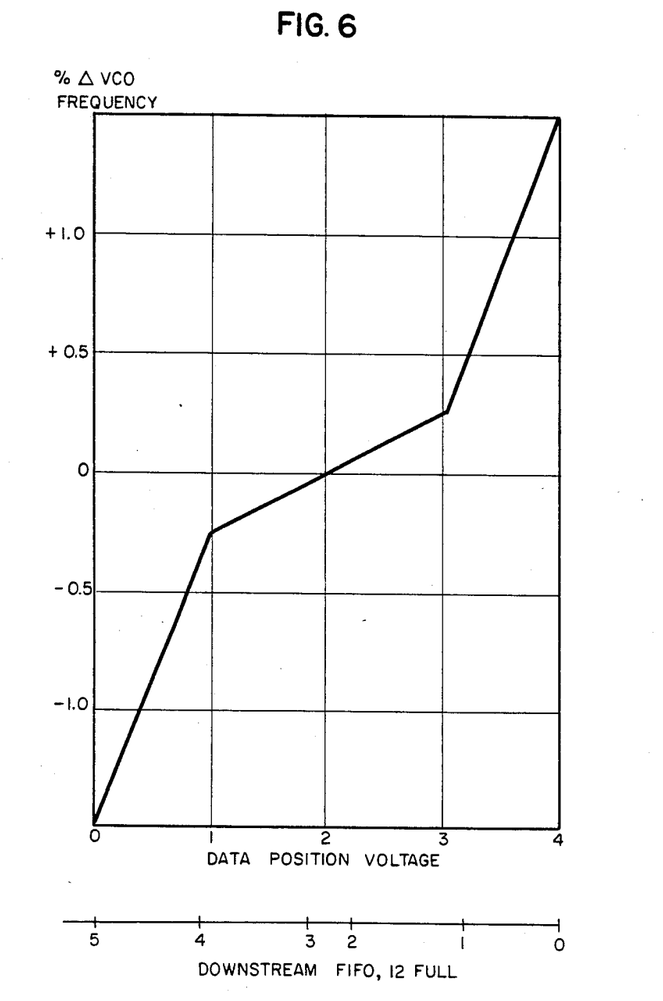
FIG. 6 is a presently preferred response curve for the circuit of FIG. 5.

As indicated above, the data position voltage (at 18) is scaled (see, for example, Electronics For Engineers, Ahmed and Spreadbury, Cambridge University Press, 1973, page 124, Library of Congress Catalog Card No. 72-93138) by the operational amplifier 22 before being applied to control the VCO. This scaling is preferably non-linear (see FIG. 6): For small changes in the data position voltage (at 18) about two volts, such voltage is applied with low gain to the VCO 26, resulting in a relatively small median clock frequency shift. Were, however, the data position voltage to get further from two volts, representing an increased error in data position, the gain of the scaling amplifier 22 would increase. Attendantly, this would cause a more drastic median clock frequency shift as the VCO 26 attempts to keep the FIFOs from under- or over-flowing. From FIG. 6, it is clear that, for example, for a shift of from $2\frac{1}{2}$ full downstream FIFOs 12 to only one full downstream FIFO, a 0.25% change in the VCO frequency occurs. However, for still another shift to zero full downstream FIFOs 12, this causes the VCO frequency to shift by 1.5%. Such non-linear response to the data position error helps to minimize jitter of the median clock, thereby allowing much of the input bit jitter to be masked.

The invention has been described in detail with particular reference to preferred embodiments thereof, but it will be understood that variations and modifications can be effected within the spirit and scope of the invention. For example, while it is presently preferred that the median clock works to keep one buffer half full/half empty, within an even split between the over=and under-flowing buffer parts I (FIG. 3), other ratios than a fifty-fifty split are possible. Also, while the disclosed multi-channel apparatus is configured to handle 5-bit bytes, apparatus with other numbers of channels may be accommodated to the practice of the invention.

What is claimed is:

1. Apparatus for assuring time coherence among data bits in a multi-channel bit-processing system, groupings of said bits comprising respective bytes, and said bytes occurring in a time sequence, said apparatus comprising:
    (a) respective clockable multi-bit buffer means for receiving the bits of said sequenced bytes,
    (b) means for detecting the occurrence of a reference bit for, and from within, each of a plurality of said bytes, and
    (c) means responsive to reference bit occurrences for producing a clock having a frequency corresponding thereto, said clock being applied to each of said buffer means for clocking therefrom data bits which are essentially devoid of time incoherence thereamong, said means for detecting the occurrence of a reference bit being means for detecting the median-occuring bit of each of said plurality of bytes.

2. Apparatus of claim 1 wherein said buffer means are respectively comprised of first and second serially connected parts, and wherein said means for detecting said median-occuring bits is means for repeatedly detecting the occurrence of approximately a given number of buffer means first parts which are fully loaded with data bits.

3. Apparatus of claim 2 (a) wherein said buffer means first and second parts are asynchronous two-port memories of the type which respectively produce flag signal voltages when fully loaded with data bits, and (b) wherein said apparatus further comprises (1) means for algebraically summing said flag signal voltages and (2) means responsive to said sum signal voltage for clocking said data bits from said buffer means at a rate that is in proportion to said sum signal voltage.

4. The apparatus of claim 3 wherein said means responsive to said sum signal voltage is a voltage controlled oscillator.

5. The apparatus of claim 4 further comprising means for nonlinearly modifying said sum signal voltage before its application to said voltage controlled oscillator., whereby the output frequency thereof nonlinearly increases whenever said sum signal voltage departs from a quiescent value or range thereof.

6. The apparatus of claim 3 further comprising means for nonlinearly modifying said sum signal voltage before its application to said means for clocking, whereby the rate of said clocking nonlinearly increases whenever said sum signal voltages departs from a quiescent value or range thereof.

7. In multi-channel apparatus for the parallel processing of the bits of successive bytes, the improvement of time base correction means for removing time incoherence among said bits, said time base correction means comprising
    (a) data bit buffering means in each of said channels for respectively receiving the bits of said bytes at respective bit rates,
    (b) means for detecting a reference bit for, and from within, each of said successive bytes, and
    (c) means responsive to said means for detecting for clocking data bits from each of said data bits buffering means, thereby to form therefrom bytes of time coherent bits, said means for detecting a reference bit for each of said successive bytes being means for detecting the median-occurring bit of each of said bytes.

8. The apparatus of claim 7 wherein (a) said data bit buffering means are respectively comprised of first and second serially connected parts and (b) said means for detecting said median occurring bits is means for producing a signal whenever there occurs a given number of fully loaded buffering means first parts.

9. The apparatus of claim 8 (a) wherein the firs and second parts of said data bit buffering means are asynchronous two-port memories of the type which respectively produce flag signal voltages when fully loaded with data bits, and (b) said time base correction means further comprises (1) means for adding together said flag voltages to form a sum signal voltage and (2) means responsive to said sum signal voltage for clocking said data bits out of all said buffering means at a rate proportional thereto.

10. The apparatus of claim 9 wherein said means responsive to said sum signal voltage is a voltage controlled oscillator.

11. The apparatus of claim 10 further comprising means for nonlinearly modifying said sum signal voltage before its application to said voltage controlled oscillator, whereby the output frequency thereof nonlinearly increases whenever said sum signal voltage departs from a quiescent value or range thereof.

12. The apparatus of claim 9 further comprising means for nonlinearly modifying said sum signal voltage before its application to said means for clocking, whereby the rate of said clocking nonlinearly increases whenever said sum signal voltage departs from a quiescent value or range thereof.

13. Multi-channel apparatus for removing channel-to-channel asynchronism among the parallel bits of bytes in a succession of bytes comprising
 (a) means for producing a clock signal corresponding to the median bit of and from within each said byte
 (b) clockable multi-bit buffer means in each said channel for receiving at random times respective bits of said bytes, and
 (c) means for applying said median bit clock signal to all said buffer means to clock bytes therefrom which are composed of bits having the same time frame.

* * * * *